Jan. 14, 1964  H. R. BILLETER  3,117,589
VALVE ACTUATION MECHANISMS
Filed Oct. 26, 1960  2 Sheets-Sheet 1
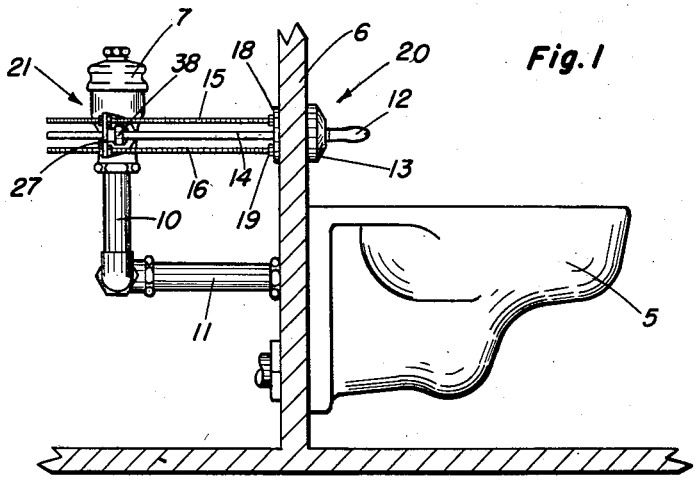
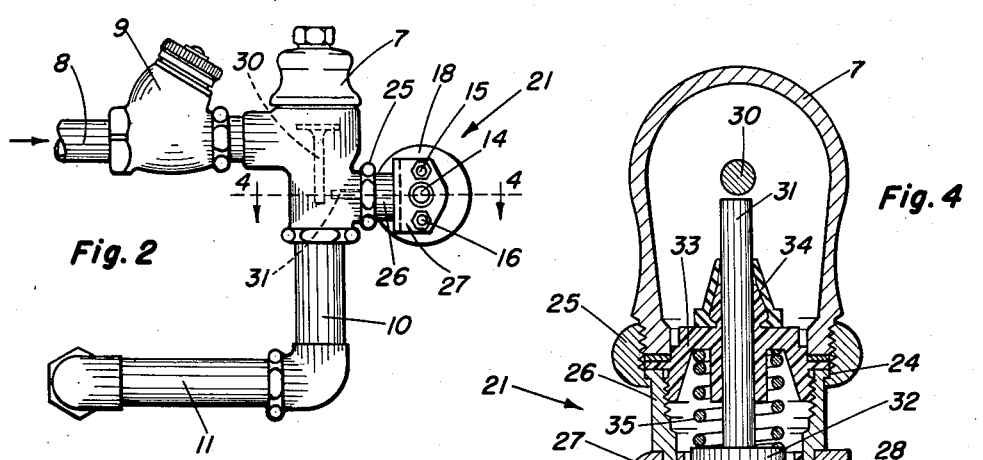
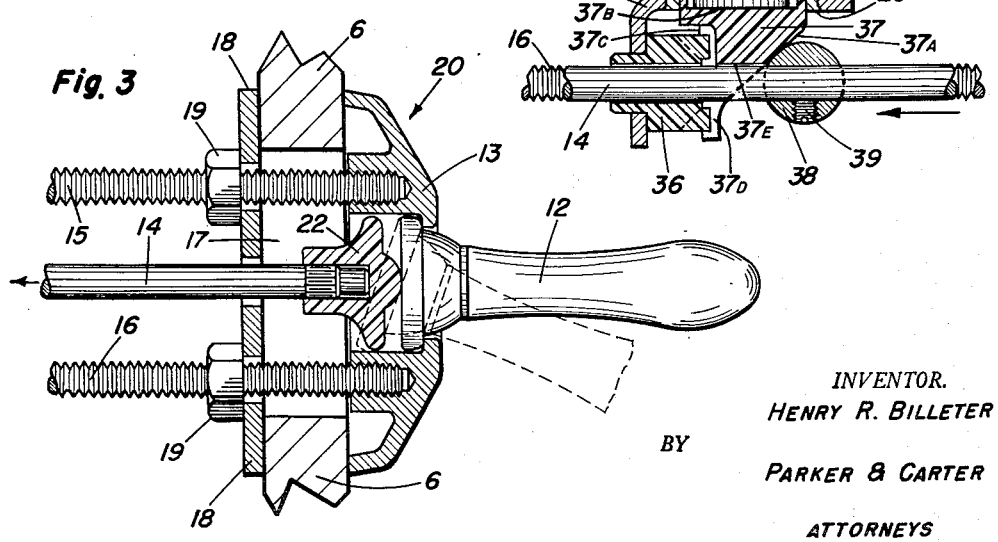
INVENTOR.
HENRY R. BILLETER
BY
PARKER & CARTER
ATTORNEYS Jan. 14, 1964     H. R. BILLETER     3,117,589
VALVE ACTUATION MECHANISMS
Filed Oct. 26, 1960     2 Sheets-Sheet 2
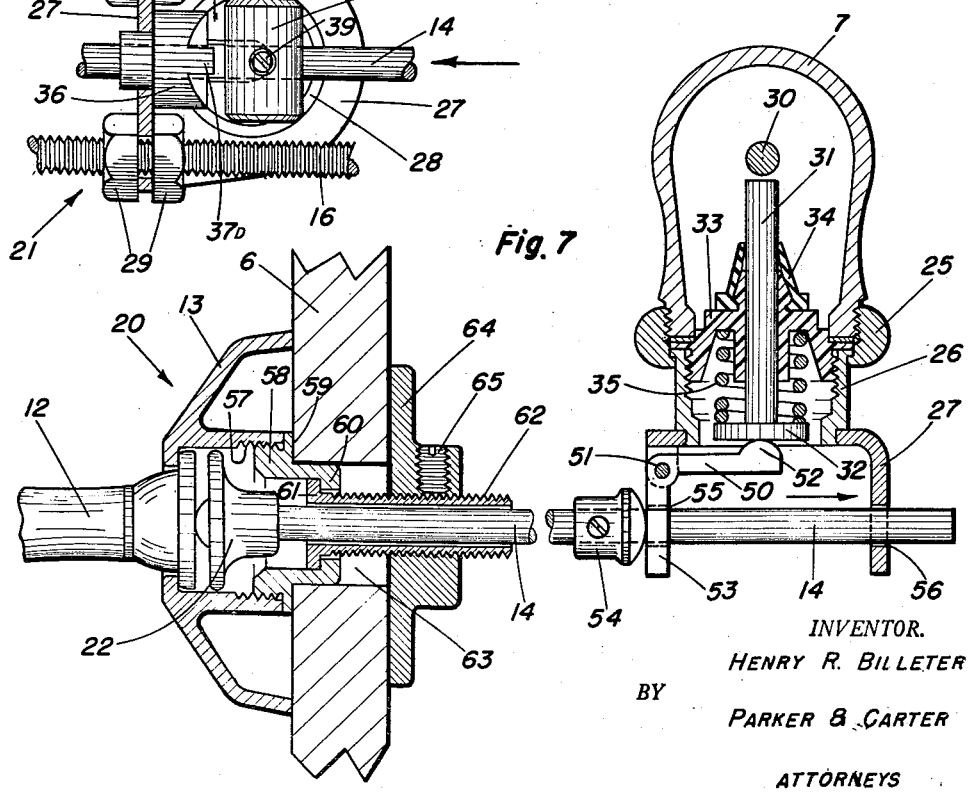
INVENTOR.
HENRY R. BILLETER
BY
PARKER & CARTER
ATTORNEYS

3,117,589
VALVE ACTUATION MECHANISMS
Henry R. Billeter, Deerfield, Ill., assignor to Sloan Valve Company, Chicago, Ill., a corporation of Illinois
Filed Oct. 26, 1960, Ser. No. 65,042
8 Claims. (Cl. 137—360)

This invention relates in general to mechanisms for actuating valves and more particularly to new and improved actuating mechanisms for operating flush valves used in plumbing fixtures.

It is an object of the invention to provide a new and improved actuating mechanism for a flush valve concealed behind a wall surface wherein the flush valve may be supported a variable distance from the rear of the wall surface.

A further object is to provide a new and improved flush valve actuating mechanism which can be installed in a wall surface regardless of the thickness of the wall behind which the flush valve is located.

Another object is to provide an improved flush valve operating mechanism for a flush valve located behind a wall of variable thickness in which accurate roughing-in dimensions are not necessary when installing the flush valve, thereby saving on labor and installation costs.

Additional objects are to design a new and improved flush valve actuating mechanism which is positive and reliable in operation, relatively simple in construction, easy to install, is adaptable for various wall thicknesses, and solves many unforeseen problems which may be encountered in an installation where the flush valves are concealed behind a wall.

In many plumbing installations the flush valves for the water closets or other plumbing fixtures are concealed behind a wall in front of which the fixture is located. In such cases the handle for operating the flush valve protudes from the front of the wall where it is readily accessible to the user of the water closet, while the extension coupling of the handle passes through the wall and is rigidly connected to the flush valve. When installing such concealed flush valves in the past, the plumber was confronted many times with the problem of ordering the correct length of handle coupling because of the many different wall thicknesses encountered and the location of the flush valve behind the wall. It was also necessary for the plumber to place the flush valve more or less accurately directly in line with the handle and at the correct position at the end of the handle coupling. All of the foregoing necessitated additional labor and installation costs and involved complicated actuating mechanism.

The foregoing disdvantages have been overcome by the present invention in which a novel flush valve operating mechanism is provided which is universally adapted for any wall thickness that may be encountered on a job; wherein accurate roughing-in dimensions need not necessarily be adhered to; installation is much easier made, and the need for stocking various lengths of hand extensions to accommodate different wall thicknesses, is eliminated.

A particular feature of the invention resides in a novel push rod actuated by the operating handle, together with a bell-crank arrangement operated by the push rod to actuate the flush valve, the operating mechanism of the flush valve being arranged generally at right angles to the movement of the push rod.

With the foregoing and other objects in view, the invention consists of certain novel features of construction, operation and combination of elements which will be more fully described, illustrated and pointed out hereinafter.

Referring to the drawings which illustrate a preferred embodiment of the invention and several modifications thereof;

FIG. 1 is a view of a typical plumbing installation illustrating the invention applied thereto;

FIG. 2 is a side view of FIG. 1 shown on a larger scale;

FIG. 3 is a full size cross-sectional view showing the handle operating mechanism;

FIG. 4 is a full size cross-sectional view taken along the line 4—4 of FIG. 2 showing the flush valve operating mechanism;

FIG. 5 is a view looking from the bottom of FIG. 4;

FIG. 6 is a modified form of the bell-crank arrangement; while

FIG. 7 shows a further modification of a bell-crank, together with a modification of the handle extension.

In FIG. 1 there is shown a typical installation of a wall-hung water closet bowl 5 mounted on a wall 6 and with a well-known type of flush valve 7, such as a "Sloan Crown" flush valve, wherein the inlet water supply pipe 8 (see FIG. 2) is connected to a throttle valve 9 attached to the flush valve. The outlet flush pipes 10 and 11 lead into the closet bowl 5 in the usual manner, and a manual operating handle 12 for operating the flush valve 7, protrudes from the front of the wall surface 6 where it is accessible to the user of the bowl. A wall flange 13 clamped against the wall surface 6 supports the handle 12 in position as shown in FIG. 3. The handle unit assembly is indicated generally at 20 in the drawings.

Extending rearwardly through the wall 6 from the wall flange 13 is a push rod 14 and two threaded rods 15 and 16, each of which is of a length sufficient to accommodate the greatest thickness of the wall 6 that may be encountered or for any position that the flush valve 7 may occupy in back of the wall remote from the handle 12 on the front. The three rods 14, 15 and 16 pass through an opening 17 cut in the wall 6 and the two threaded rods are screwed into the rear side of the wall flange 13. A circular backing plate 18 through which the rods also pass is clamped against the rear of the wall surface 6 by the nuts 19 threaded on each of the rods 15 and 16. In this manner the wall flange 13 is solidly clamped to the front of the wall surface and the rods 15 and 16 are rigidly anchored in position at their front end. This arrangement enables the handle unit to be accommodated for walls of any thickness and also prevents unauthorized removal of the handle unit from the front. The push rod 14 has a knob 22 in contact with the handle 12 so that operation of the handle in any direction will push the knob 22 inward and therefore impart a rearward thrust to the push rod 14.

The flush valve 7 is roughed-in at any desired position back of the wall 6 and alongside the three rods. The actuating unit assembly for the flush valve, indicated generally at 21, projects from the side of the flush valve 7 and at right angles to the three rods. The rods may extend rearwardly beyond the position of the actuating unit 21 where the excess rod lengths may be cut off if desired. The actuating unit 21 is rigidly attached to the flush valve body 7 by means of the coupling nut 25 engaging shoulder 24 of the connecting tube 26, as clearly seen in FIG. 4. A right angled supporting bracket 27 is securely attached to the connecting tube 26 by the end of the pipe being spun over as indicated at 28. The threaded rods 15 and 16 pass through holes in bracket 27 (see FIG. 5) and a set of lock nuts 29 on each rod are clamped to the bracket 27 on each side thereof to rigidly support the rods and the flush valve 7 in the position in which the flush valve has been mounted. This arrangement provides a solid support for the flush valve from the rear of the wall surface. The flush tubes 10 and 11 further assist in supporting the flush valve when they are connected up.

The actuating unit 21 on the flush valve further includes mechanism which is arranged to trip the relief valve stem 30 of the flush valve 7 which operates in the well known manner, to cause the flush valve to open from its seat, permitting a metered quantity of water to flow into the closet bowl 5, after which it closes off automatically. An operating plunger 31 having a head portion 32 on one end is adapted when actuated to contact its other end with the relief valve stem 30 to trip the same. Plunger 31 is supported and guided in bushing 33 and this bushing in turn is threaded into connecting pipe 26 and also has a flange portion clamped by coupling nut 25 to the valve body as shown. A flexible sealing sleeve 34 around plunger 31 prevents leakage outwardly from the interior of the flush valve to the actuating unit 21. Restoring spring 35 extending between the bottom of bushing 33 and the plunger head 32, restores the plunger 31 and other parts to normal after each operation thereof.

It will be apparent that the push rod 14 being moved in a horizontal direction as viewed in FIGS. 4 and 5, must translate this movement into a right angle or 90 degree thrust to actuate the flush valve. This is accomplished by the novel arrangement according to the invention as will now be pointed out. The push rod 14 is journaled and guided in bearing 36 which is supported upon and extends through a hole in the angle bracket 27. Also arranged on push rod 14 is a round member 38 which is adjustably held in position on the rod by the set screw 39. Between the bearing 36 and member 38 there is arranged a triangularly-shaped cam member 37 having one angular surface 37a contacted by the round member 38, the top surface 37b by the head 32 of plunger 31, and the third side surface 37c by the bearing 36. The contacting surfaces 37c and the bearing 36 are provided with tongue and groove means 37d as shown, in order to prevent rotation of the cam 37 in its bearing surface in the connecting tube 26 on the flush valve. Push rod 14 passes through a slot 37e formed in cam 37.

It is preferred that certain parts described herein be made of a plastic material such as Du Pont "Delrin" in order that advantage may be taken of the self-lubricating qualities and other economic advantages of this material. Included may be the knob 22 for the handle 12, bearing 36, cam member 37 and bushing 33.

It will be noted from the foregoing arrangement of the parts that the flush valve 7 may be positioned at any indeterminate distance remote and rearwardly from the handle 7 so that roughing-in of the flush valve need not be too accurately made. The thickness of the wall 6 need not be of any concern since the handle unit 20 is rigidly supported thereon and the rods 15 and 16 with the clamping nuts 29 and 19 firmly hold the flush valve in its set position. This would hold true if the walls 6 are of thin sheet metal as is commonly provided in institutions of various kinds.

The operation of the various parts is relatively simple. When it is desired to flush the closet bowl 5, the user simply actuates the handle 12 in any direction thereby forcing button 22 inwardly in handle unit 20 (see FIG. 3) and producing a rearwardly thrust upon the push rod 14. This causes the round member 38 (see FIG. 4) to push against and slide along cam surface 37a of cam 37, forcing the cam member 37 upwardly and at right angles to the thrust of member 38. Since plunger head 32 rests against surface 37b of the cam, the plunger 31 is given a thrust which results in the end of the plunger tripping the relief valve stem 30 and causing operation of the flush valve 7. The cam 37 is also guided inwardly by the sliding action of the tongue and groove arrangement 37d against the bearing 36. Upon release of the handle 12, the restoring spring 35 exerts its compression under the plunger head 32 against cam surface 37b, thereby forcing cam 37 downwardly and with a sliding action of surface 37a pushes round member 38 in the opposite direction to restore all the parts to normal. It is apparent that restoring spring 35 must be sufficiently strong to cause the cam 37, member 38, push rod 14 to be moved back to their normal position and with the handle 12 held in its normal horizontal position as shown.

There may be occasions when it is necessary or desirable to mount the flush valve 7 on the opposite side of the rods 14, 15 and 16 from the position viewed in FIG. 4. In such case it is only necessary to place the bracket 27 below and on the opposite side of the three rods from that shown. The coupling nut 25 is then tightened on the flush valve body as before with the flush valve in upright position.

Referring now to the modification shown in FIG. 6, this is a form of bell-crank arrangement for transferring the trust of the push rod 14 in a right angle direction to trip the flush valve. The bell-crank member 40 of irregular shape, has a hook portion 41 constituting a hinge which is pivoted on the edge 42 formed in supporting bracket 27. The push rod 14 passes through a hole 43 in member 40 and a cam member 44 adjustable on push rod 14, has a nose portion 45 bearing in recess 46 of member 40. The left-hand movement of push rod 14 forces cam member 44 against the recess 46 of bell-crank 40 which being pivoted at 42, rotates its arm 47 upwardly against the plunger head 32 and thereby causes the plunger end 31 to come into flush valve tripping engagement with the relief valve stem 30. The spring 35 restores the elements when the pressure on push rod 14 is released. This bell-crank arrangement is somewhat simpler from that shown in FIG. 4 and comprises fewer parts, and is also much easier to assemble. The excess rod lengths beyond the location of the flush valve and bell-crank may be cut off as before.

In the modification shown in FIG. 7 a further bell-crank operating arrangement is shown wherein the bell-crank 50 is pivoted at 51 to the supporting bracket 27 and has one arm 52 in contact with the plunger head 32 and the other arm 53 is contacted by the cam member 54 adjustably secured upon the push rod 14. The push rod 14 passes through hole 55 in bell crank arm 53 and also hole 56 in the bracket 27 where the rod is guided. Operation of the push rod 14 causes tripping of the flush valve by the bell crank 50 transferring the horizontal thrust of the push rod 14 into a vertical movement at right angles thereto.

In this modification there is also shown a handle unit arrangement in which the use of the two threaded rods 15 and 16 of FIG. 1 is dispensed with. The wall flange 13 is internally threaded at 57 to accommodate a bushing 58 having a flange portion 59 resting against the wall surface 6. Bushing 58 has an internal ledge 60 upon which the head 61 of the threaded tube 62 rests. Threaded tube 62 passes rearwardly through the opening 63 in the wall. A clamping plate 64 threaded on tube 62 clamps the wall flange 13 to the wall surface through the medium of the bushing 58. Set screw 65 locks the clamping plate 64 from becoming loose on tube 62. The push rod 14 extends axially through the tube 62 and its head portion 22 is adapted to be pushed inwardly upon actuation of the handle 12. With this arrangement any wall thicknesses encountered may be accommodated by the threaded tube 62 and the excess length cut off. The handle unit is solidly supported on the wall and a smaller hole can be drilled through the wall 6. Since the only connection between the handle unit 20 and the flush valve actuating unit 21 is in the push rod 14, the flush valve 7 itself must be well supported in its set position. This can be done by insuring that the flush tubes 10 and 11 are rigidly supported and connected to the outlet of the flush valve, and that the inlet water supply connection 8 and throttle 9 are securely conneced to the flush valve.

While the invention has been illustrated and described in several different versions, it will be understood that it may be capable of other modifications to those skilled in the art, and it is therefore desired not to limit the invention to the precise constructions shown, but only to the extent of the appended claims.

What is claimed is:

1. In a flush valve operating arrangement in which the flush valve is located behind a wall and the operating handle is mounted on the front of the wall, an actuating unit attached to said flush valve, a handle unit on the wall supporting said operating handle, a push rod extending directly rearward from the wall and connected to said handle unit whereby operation of the handle imparts a rearward thrust to said push rod, said flush valve being arranged along the side of and adjacent said push rod with said push rod extending beyond said flush valve depending upon the position of said flush valve with respect to the rear of said wall, means extending from the rear of said wall adjustably engaging said actuating unit for supporting said flush valve, said means also having a portion extending beyond the location of said flush valve whereby said flush valve may be supported at any intermediate distance from the rear of said wall, said actuating unit projecting from the side of said flush valve in the direction of said push rod, and cooperative means on said push rod and said actuating unit whereby movement of said push rod is transmitted to said actuating unit to operate said flush valve.

2. In a flush valve operating arrangement in which the flush valve is located behind a wall and the operating handle for the same is mounted on the front of the wall, an actuating unit attached to said flush valve, a handle unit on said wall supporting said operating handle, a push rod extending directly rearwardly from said wall and connected to said handle unit whereby operation of said handle imparts a rearward thrust to said push rod, said flush valve being mounted alongside said push rod and in a position depending upon how far said flush valve is located away from the rear of said wall, means extending from the rear of said wall adjustably engaging said actuating unit for supporting said flush valve, said means also having a portion extending beyond the location of said flush valve whereby said flush valve may be supported at any intermediate distance from the rear of said wall, said actuating unit projecting from the side of said flush valve towards said push rod, and cam means connected between said push rod and said actuating unit for transmitting movement of said push rod to said actuating unit to operate said flush valve.

3. In a flush valve operating arrangement in which the flush valve is located behind a wall and the operating handle is mounted on the front of the wall, an actuating unit attached to said flush valve, a handle unit on the front of said wall supporting said operating handle, a push rod extending directly rearward from said wall and connected to said handle unit whereby operation of said handle unit imparts a rearward thrust to said push rod, said flush valve being mounted adjacent said push rod and a variable distance from the rear of the wall, means extending from the rear of said wall adjustably engaging said actuating unit for supporting said flush valve, said means also having a portion extending beyond the location of said flush valve whereby said flush valve may be supported at any intermediate distance from the rear of said wall, said actuating unit arranged on the side of said flush valve contiguous to said push rod, a bell-crank means arranged between said push rod and said actuating unit for transmitting the thrust of said push rod to said actuating unit to operate said flush valve, and means in said actuating unit for restoring said push rod when the handle is released.

4. In a flush valve operating arrangement in which the flush valve is located a variable distance behind a wall and the operating handle for the flush valve is mounted on the front of the wall, an actuating unit mounted on said flush valve including a supporting bracket, a handle unit on the front of the wall supporting said operating handle, a push rod extending rearwardly from said handle unit and connected to said operating handle whereby operation of said handle imparts a rearward thrust to said push rod, said flush valve being positioned contiguous to said push rod and said push rod extending through said supporting bracket, a threaded supporting rod attached to and extending rearwardly from said handle unit and through said supporting bracket, means for fastening said threaded supporting rod to said supporting bracket at the position where said flush valve is located with respect to said wall, said supporting rod having a portion extending beyond the location of said flush valve whereby said flush valve may be supported any intermediate distance from the rear of said wall, a wall bracket on said threaded supporting rod clamped to the rear of the wall for holding said handle unit tightly against the front of the wall regardless of the wall thickness, and cam action means for transmitting the movement of said push rod to said actuating unit for operating of said flush valve.

5. In a flush valve operating ararngement in which the flush valve is arranged an indefinite distance behind a wall surface and the operating handle for the flush valve is arranged on the fron the wall surface, an actuating unit mounted on said flush valve including a supporting bracket, a handle unit on the front of the wall surface supporting said operating handle, a push rod extending rearwardly from said operating handle and actuated thereby to provide a rearward thrust to said push rod, said push rod extending through said supporting bracket and guided thereby, threaded supporting rods attached by one end to said handle unit and having the other end extending through said supporting bracket, means for securing said threaded rods to said supporting bracket to support said flush valve, a clamping plate on said threaded rods held against the rear wall to tightly hold said handle unit against the front of said wall and thereby accommodate the handle unit to fit walls of variable thickness, said threaded rods and said push rod being arranged parallel to one another, and cam action means supported on said supporting bracket for causing the actuating unit to operate said flush valve whenever said push rod is operated by said operating handle, and means in said actuating unit for restoring said cam action means and said push rod after each operation thereof.

6. In a flush valve operating arrangement in which the flush valve is arranged a variable distance behind a wall surface and the operating handle for the flush valve is located on the front of the wall surface, an actuating unit mounted on said flush valve including a supporting bracket, a handle unit on the front of the wall surface supporting said operating handle, a push rod extending rearwardly from said operating handle and actuated thereby to provide a rearward thrust to said push rod, said push rod extending through said supporting bracket and guided thereby, a threaded supporting rod attached by one end to said handle unit and having its other end extending through and fastened to said supporting bracket, said push rod and said threaded rod being long enough to extend through said supporting bracket so that said flush valve is enabled to be positioned variably along the length of said rods and adjacent thereto, clamping means on said threaded rod on the rear surface of the wall for holding said handle unit securely against the front wall surface regardless of the wall thickness, cooperative cam means between said push rod and said actuating unit for transmitting the thrust of said push rod to said actuating unit to operate said flush valve, adjustable means on said push rod for holding said cam means in position in accordance with the location of said flush valve, and spring means in said actuating unit for restoring said cam means and said push rod after each operation thereof.

7. In a flush valve operating arrangement in which the flush valve may be located a variable distance behind a wall surface and the operating handle is located on the front wall surface, an actuating unit mounted on said flush valve including a supporting bracket, a handle unit on the front of the wall surface supporting said operating handle, a push rod extending rearwardly from said operating handle and actuated thereby to provide a rearward thrust to said push rod, said push rod extending through said supporting bracket and guided thereby, said flush valve adapted to be positioned at any location along the length of said push rod and on one side thereof, means extending from the rear of said wall adjustably engaging said actuating unit for supporting said flush valve, said means also having a portion extending beyond the location of said flush valve whereby said flush valve may be supported at any intermediate distance from the rear of said wall, said supporting bracket adapted to be reversed around said push rod to enable said flush valve to be positioned on the other side of said push rod, and cam means for transmitting the thrust of said push rod to said actuating unit to cause operation of said flush valve regardless of the side of said push rod that the flush valve is located.

8. In a flush valve operating arrangement, a handle unit supported on a wall surface with the flush valve located behind the wall and at a remote distance from said handle unit, operating means on said flush valve extending from one side thereof, a rigid connection movable by said handle unit and extending rearwardly from said handle unit through the wall for a distance beyond the position of said flush valve, said flush valve adapted to be located at any position along the length of said rigid connection and contiguous thereto, means extending from the rear of said wall adjustably engaging said actuating unit for supporting said flush valve, said means also having a portion extending beyond the location of said flush valve whereby said flush valve may be supported at any intermediate distance from the rear of said wall, and cooperating means between said rigid connection and said operating means for transmitting the movement of said rigid connection to said operating means to operate said flush valve.

References Cited in the file of this patent

UNITED STATES PATENTS

| 974,266 | Hennebohle | Nov. 1, 1910 |
| 1,740,860 | Hansen | Dec. 24, 1921 |
| 1,850,354 | Owens | Mar. 22, 1932 |
| 1,856,845 | Donahue | May 3, 1932 |
| 1,929,522 | Schulte | Oct. 10, 1933 |
| 2,858,846 | Parker | Nov. 4, 1958 |
| 2,959,186 | McClenahan | Nov. 8, 1960 |